United States Patent
Swierczynski et al.

(10) Patent No.: US 11,782,145 B1
(45) Date of Patent: Oct. 10, 2023

(54) 3D VISION SYSTEM WITH AUTOMATICALLY CALIBRATED STEREO VISION SENSORS AND LIDAR SENSOR

(71) Applicant: NODAR Inc., Somerville, MA (US)

(72) Inventors: Piotr Swierczynski, Providence, RI (US); Leaf Alden Jiang, Concord, MA (US); Matthew Beveridge, Ijamsville, MD (US)

(73) Assignee: NODAR Inc., Somerville, MA (US)

( * ) Notice: Subject to any disclaimer, the term of this patent is extended or adjusted under 35 U.S.C. 154(b) by 0 days.

(21) Appl. No.: 17/867,826

(22) Filed: Jul. 19, 2022

Related U.S. Application Data

(60) Provisional application No. 63/351,910, filed on Jun. 14, 2022.

(51) Int. Cl.
*G01S 7/497* (2006.01)
*G01S 17/894* (2020.01)
(Continued)

(52) U.S. Cl.
CPC .......... *G01S 7/4972* (2013.01); *G01S 17/894* (2020.01); *G01S 17/931* (2020.01); *G06T 7/85* (2017.01); *G06T 2207/10028* (2013.01)

(58) Field of Classification Search
CPC ........ G01S 17/931; G01S 17/86; G01S 17/89; G01S 7/4972; G01S 7/497; G01S 17/42;
(Continued)

(56) References Cited

U.S. PATENT DOCUMENTS 6,392,688 B1 5/2002 Barman et al.
8,208,716 B2 6/2012 Choi et al.
(Continued)

FOREIGN PATENT DOCUMENTS

EP 1 457 384 A1 9/2004
JP 2003-269917 A 9/2003
(Continued)

OTHER PUBLICATIONS

John, Vijay, et al. "Automatic calibration and registration of lidar and stereo camera without calibration objects." 2015 IEEE International Conference on Vehicular Electronics and Safety (ICVES). IEEE, 2015. (Year: 2015).*
(Continued)

*Primary Examiner* — Luke D Ratcliffe
(74) *Attorney, Agent, or Firm* — Wolf, Greenfield & Sacks, P.C.

(57) ABSTRACT

An automatically calibrated vision system includes: a vision calibration system; a first sensor system that receives first data of a scene captured by a first sensor on a movable machine and outputs a first map based on the first data; a second sensor system that receives second data of the scene captured by a second sensor on the movable machine and outputs a second map based on the second data. The vision calibration system computes calibration data based on the first and second maps, supplies the calibration data to the first sensor system and/or the second sensor system for automatic calibration of the first sensor system and/or the second sensor system, and outputs, to a controller of the movable machine, a calibrated depth map comprised of depth measurements calibrated using the calibration data. The first sensor system and/or the second sensor system automatically perform(s) a self-calibration using the calibration data.

12 Claims, 7 Drawing Sheets

(51) Int. Cl.
*G06T 7/80* (2017.01)
*G01S 17/931* (2020.01)

(58) Field of Classification Search
CPC ......... G01S 17/894; G06T 2207/10028; G06T 2207/30252; G06T 7/85; G06T 7/80; G06T 7/97; G06T 15/00; G06V 20/56; G06V 20/58
See application file for complete search history.

(56) References Cited

U.S. PATENT DOCUMENTS

| | | | |
|---|---|---|---|
| 8,797,387 | B2 | 8/2014 | Huggett et al. |
| 8,971,634 | B2 | 3/2015 | Barnum |
| 8,981,966 | B2 | 3/2015 | Stein et al. |
| 9,286,680 | B1 | 3/2016 | Jiang et al. |
| 9,369,689 | B1* | 6/2016 | Tran ..................... H04N 13/239 |
| 9,509,979 | B2 | 11/2016 | Livyatan et al. |
| 9,958,964 | B2 | 5/2018 | Wurster |
| 10,097,812 | B2 | 10/2018 | Livyatan et al. |
| 10,244,228 | B2 | 3/2019 | Millett |
| 10,257,489 | B2 | 4/2019 | Nam |
| 10,430,959 | B2 | 10/2019 | Chang et al. |
| 10,567,748 | B2 | 2/2020 | Okouneva |
| 10,591,594 | B2 | 3/2020 | Oyaizu et al. |
| 10,965,929 | B1 | 3/2021 | Bellows et al. |
| 11,024,037 | B2 | 6/2021 | Du et al. |
| 11,157,751 | B2 | 10/2021 | Kumano et al. |
| 11,282,234 | B2 | 3/2022 | Jiang et al. |
| 11,321,875 | B2 | 5/2022 | Jiang et al. |
| 11,321,876 | B2 | 5/2022 | Jiang et al. |
| 11,427,193 | B2 | 8/2022 | Jiang et al. |
| 11,577,748 | B1 | 2/2023 | Wang et al. |
| 2006/0140510 | A1 | 6/2006 | Wallace et al. |
| 2007/0291125 | A1 | 12/2007 | Marquet |
| 2009/0195371 | A1 | 8/2009 | Camus |
| 2010/0208034 | A1 | 8/2010 | Chen |
| 2011/0050864 | A1 | 3/2011 | Bond |
| 2012/0321172 | A1 | 12/2012 | Jachalsky et al. |
| 2013/0188018 | A1 | 7/2013 | Stevens et al. |
| 2013/0329015 | A1 | 12/2013 | Pulli et al. |
| 2014/0119663 | A1 | 5/2014 | Barnum |
| 2014/0267616 | A1 | 9/2014 | Krig |
| 2015/0103147 | A1 | 4/2015 | Ho et al. |
| 2016/0323560 | A1 | 11/2016 | Jin et al. |
| 2017/0278014 | A1 | 9/2017 | Lessmann et al. |
| 2017/0287169 | A1 | 10/2017 | Garcia |
| 2017/0358092 | A1 | 12/2017 | Bliebel et al. |
| 2018/0222499 | A1 | 8/2018 | Gomes et al. |
| 2019/0087186 | A1 | 3/2019 | Endo |
| 2019/0158813 | A1 | 5/2019 | Rowell et al. |
| 2019/0204427 | A1 | 7/2019 | Abari et al. |
| 2019/0208181 | A1 | 7/2019 | Rowell et al. |
| 2019/0220989 | A1 | 7/2019 | Harmsen et al. |
| 2019/0289282 | A1 | 9/2019 | Briggs et al. |
| 2019/0295282 | A1 | 9/2019 | Smolyanskiy et al. |
| 2019/0304164 | A1 | 10/2019 | Zhang |
| 2020/0064483 | A1 | 2/2020 | Li et al. |
| 2020/0177870 | A1 | 6/2020 | Tadi et al. |
| 2020/0346581 | A1 | 11/2020 | Lawson et al. |
| 2020/0409376 | A1 | 12/2020 | Ebrahimi Afrouzi et al. |
| 2021/0003683 | A1 | 1/2021 | Chen et al. |
| 2021/0118162 | A1 | 4/2021 | Fang et al. |
| 2021/0264175 | A1 | 8/2021 | Zhang et al. |
| 2021/0327092 | A1* | 10/2021 | Jiang ..................... H04N 13/243 |
| 2021/0350576 | A1 | 11/2021 | Jiang et al. |
| 2021/0352259 | A1 | 11/2021 | Jiang et al. |
| 2022/0111839 | A1 | 4/2022 | Jiang et al. |
| 2023/0005184 | A1 | 1/2023 | Jiang et al. |
| 2023/0076036 | A1 | 3/2023 | Jiang et al. |

FOREIGN PATENT DOCUMENTS

| | | |
|---|---|---|
| JP | 2008-509619 A | 3/2008 |
| JP | 2015-158749 A | 9/2015 |
| WO | WO 2016/171050 A1 | 10/2016 |
| WO | WO 2017/057058 A1 | 4/2017 |
| WO | WO 2017/209015 A1 | 12/2017 |
| WO | WO 2018/196001 A1 | 11/2018 |
| WO | WO 2021/150369 A1 | 7/2021 |

OTHER PUBLICATIONS

Cholakkal, Hafeez Husain, et al. "LiDAR-Stereo Camera Fusion for Accurate Depth Estimation." 2020 AEIT International Conference of Electrical and Electronic Technologies for Automotive (AEIT Automotive). IEEE, 2020. (Year: 2020).*

Rosero, Luis Alberto, and Fernando Santos Osório. "Calibration and multi-sensor fusion for on-road obstacle detection." 2017 Latin American Robotics Symposium (LARS) and 2017 Brazilian Symposium on Robotics (SBR). IEEE, 2017 (Year: 2017).*

Hsu, Chih-Ming, et al. "Online Recalibration of a Camera and Lidar System." 2018 IEEE International Conference on Systems, Man, and Cybernetics (SMC). IEEE, 2018. (Year: 2018).*

[No Author Listed] NODAR Brick Demo. Vimeo. https://vimeo.com/497966938. Jan. 2021 7:1.

Achanta et al., SLIC superpixels compared to state-of-the-art superpixel methods. IEEE Transactions on Pattern Analysis and Machine Intelligence. May 29, 2012;34(11):2274-82.

Adi et al., Distance measurement with a stereo camera. Int. J. Innov. Res. Adv. Eng. Nov. 2017;4(11):24-7.

Badino et al., Free space computation using stochastic occupancy grids and dynamic programming. Workshop on Dynamical Vision, ICCV, Rio de Janeiro, Brazil. Oct. 20, 2007;20:73.

Bishop, Emerging from stealth, NODAR introduces "Hammerhead 3D Vision" platform for automated driving. Forbes. https://www.forbes.com/sites/richardbishop1/2021/01 /07/emerging-from-stealth-nodar-introduces-hammerhead-3d-vision-platform-for-automated-driving/?sh=22b3b5f77ff2. Jan. 2021 7:1-11.

Dai et al., A Review of 3D Object Detection for Autonomous Driving of Electric Vehicles. World Electric Vehicle Journal. Sep. 2021;12(3):139.

Fan et al., Real-time stereo vision-based lane detection system. Measurement Science and Technology. May 24, 2018;29(7):074005.

Feng et al., Deep multi-modal object detection and semantic segmentation for autonomous driving: Datasets, methods, and challenges. IEEE Transactions on Intelligent Transportation Systems. Feb. 17, 2020;22(3):1341-60.

Guindel et al., Automatic extrinsic calibration for lidar-stereo vehicle sensor setups. 2017 IEEE 20th International Conference on Intelligent Transportation Systems (ITSC). Oct. 2017 16:1-6.

Hamid et al., Stereo matching algorithm based on deep learning: A survey. Journal of King Saud University: Computer and Information Sciences. Aug. 2020 28:1-11.

Hinzmann et al., Flexible stereo: Constrained, non-rigid, wide-baseline stereo vision for fixed-wing aerial platforms. 2018 IEEE International Conference on Robotics and Automation (ICRA) May 2018 21:2550-7.

Hirschmüller et al., Evaluation of cost functions for stereo matching. 2007 IEEE Conference on Computer Vision and Pattern Recognition. Jun. 2007 17:1-8.

Hirschmüller, Stereo processing by semiglobal matching and mutual information. IEEE Transactions on Pattern Analysis and Machine Intelligence. Dec. 18, 2007;30(2):328-41.

Hu et al., A quantitative evaluation of confidence measures for stereo vision. IEEE Transactions on Pattern Analysis and Machine Intelligence. Jan. 31, 2012;34(11):2121-33.

Kakegawa et al., Road surface segmentation based on vertically local disparity histogram for stereo camera. International Journal of Intelligent Transportation Systems Research. May 2018;16(2):90-7.

Longuet-Higgins, A computer algorithm for reconstructing a scene from two projections. Nature. Sep. 1981;293(5828):133-5.

Nelder et al., A simplex method for function minimization. The Computer Journal. Jan. 1, 1965;7(4):308-13.

Poggi et al., On the confidence of stereo matching in a deep-learning era: a quantitative evaluation. IEEE Transactions on Pattern Analysis and Machine Intelligence. Apr. 2021 2:1-8.

(56) References Cited

OTHER PUBLICATIONS

Rajaraman et al., Fully automatic, unified stereo camera and LiDAR-camera calibration. Automatic Target Recognition XXXI. Apr. 12, 2021;11729:270-277.

Rhemann et al., Fast cost-volume filtering for visual correspondence and beyond. CVPR '11: Proceedings of the 2011 IEEE Conference on Computer Vision and Pattern Recognition. Jun. 2011:3017-24.

Sarika et al., Census filtering based stereomatching under varying radiometric conditions. Procedia Computer Science. Jan. 1, 2015;58:315-20.

Shin et al., Vision-based navigation of an unmanned surface vehicle with object detection and tracking abilities. Machine Vision and Applications. Jan. 2018;29(1):95-112.

Woo et al., Localization for autonomous driving. Handbook of Position Location: Theory, Practice, and Advances, Second Edition. Mar. 23, 2018:1051-87.

Zaarane et al., Distance measurement system for autonomous vehicles using stereo camera. Array. Mar. 1, 2020;5:100016.

Zabih et al., Non-parametric local transforms for computing visual correspondence. European Conference on Computer Vision May 2, 1994:151-158.

Zhang et al., A robust and rapid camera calibration method by one captured image. IEEE Transactions on Instrumentation and Measurement. Dec. 17, 2018;68(10):4112-21.

International Search Report and Written Opinion for International Application No. PCT/US2022/037532, dated Oct. 6, 2022.

U.S. Appl. No. 17/693,634, filed Mar. 14, 2022, Jiang et al.

U.S. Appl. No. 17/682,163, filed Feb. 28, 2022, Wang et al.

U.S. Appl. No. 17/887,588, filed Aug. 15, 2022, Jiang et al.

PCT/US2022/037532, Oct. 6, 2022, International Search Report and Written Opinion.

T. Ashigahara, How close has computer vision come to human vision? Difficulties and practical approaches to avoid them. Vision Systems for robots and their applications. Journal of the Institute of Image Information and Television Engineers. Dec. 1, 2006;60(12):1914-9.

\* cited by examiner

3D VISION SYSTEM WITH AUTOMATICALLY CALIBRATED STEREO VISION SENSORS AND LIDAR SENSOR

CROSS REFERENCE TO RELATED APPLICATIONS

The present application claims the benefit of priority of U.S. Provisional Application No. 63/351,910 filed Jun. 14, 2022, entitled "3D VISION SYSTEM WITH AUTOMATICALLY CALIBRATED STEREO VISION SENSORS AND LIDAR SENSOR," the entire contents of which is incorporated by reference herein.

FIELD OF THE INVENTION

The technology of the present invention relates to three-dimensional (3D) vision systems. In particular, the present technology relates to a 3D vision system that combines information from multiple different types of sensor systems. The 3D vision system may automatically calibrate extrinsic geometric parameters between camera sensors of a stereo camera system and a lidar sensor of a lidar system, and may automatically calibrate the stereo camera system and/or the lidar system to provide a correct range or depth to one or more objects in a scene captured by the camera sensors and/or the lidar sensors.

BACKGROUND 3D vision systems have become more and more widely used in industries where sight or vision is required for machinery to move in an unconstrained environment (e.g., at the speed limit on an interstate highway; at a crosswalk near pedestrians and vehicles; in a collapsed building; in a forest; etc.) but where humans may not be present. In one example, stereo vision systems may be used in autonomous robots deployed in search and rescue operations where it may be dangerous for a human to be present. In another example, stereo vision systems may be used in autonomous vehicles (e.g., trucks, automobiles, drones, etc.) to "see" nearby terrain and objects near and far (e.g., landmarks, road signs, other vehicles in traffic, etc.) and to provide data to other electronic systems that control movement of the vehicles. In yet another example, 3D vision systems utilizing lidar (light detection and ranging) technology have been widely used in industries where sight or vision is required in a harsh or potentially harsh environment not conducive for human activity (e.g., extraterrestrial vision (i.e., in space), undersea vision, vision from meteorological vessels (e.g., weather balloons), etc.).

In order for 3D vision systems to enable safe operation of autonomous moving machines (e.g., autonomous robots, autonomous vehicles, etc.), it is desirable for the 3D vision systems to provide vision information that is reliable and accurate. Additionally, to enable sufficient time for autonomous moving machines to react safely in response to the vision information, it is desirable for the vision information to be provided to control systems of the autonomous moving machines in real time or nearly real time. For example, it is desirable for range or depth estimates determined by a vision system to be accurate and reliable, to enable a control system of an autonomous vehicle to use the estimates to detect an upcoming road hazard and cause the vehicle to move to avoid the hazard. Such estimates may not be useful if they cannot be processed in time to permit the vehicle to be controlled to move safely to avoid the hazard. Therefore, it is particularly desirable for such estimates to be determined in real time or nearly real time in order for the vehicle, which may be moving at typical speed limits on an interstate highway, to have sufficient time to move safely to avoid the hazard.

Lidar vision systems typically use light (e.g., laser light) reflected from an object to determine a range or distance to the object, based on an elapsed-time measurement for emitted light to reach the object, to reflect from the object, and to return and be detected. The light may be scanned over the object to determine surface features, which may be determined from variations in the detection times. However, because of its reliance on detection of reflected light, lidar vision systems may not be able to provide reliable and/or accurate range information when a scene is obscured by rain, snow, fog, smoke, pollution, etc., or when reflected light may not be readily discernable from other light in the scene (e.g., excessive sunlight at low angles near objects, objects near spotlights or other light sources, etc.).

Stereo vision systems typically use two cameras (e.g., left and right cameras) to provide 3D information of a scene captured by the cameras. The 3D information may include a two-dimensional (2D) image of the scene and an estimate of distance for each pixel of the image. The distance may be estimated by measuring a disparity or parallax between matching pixels in a left image captured by the left camera and a right image captured by the right camera simultaneously with the left image. As used herein, the term "camera sensor" and the term "camera" may be used interchangeable to refer to a device configured to capture a 2D image of a scene. For example, U.S. Pat. No. 8,208,716 discloses a stereo vision system and method that outputs a disparity map, which is a 2D matrix that contains pixel-shift data corresponding to a rectified image captured by one of the cameras (often the left camera). An estimate of depth for each pixel of the image, corresponding to a distance from the camera to an object imaged in the pixel, may be computed from the disparity map because the depth of the pixel is inversely proportional to the disparity of the pixel. As such, the terms "depth map" and "disparity map" may be used interchangeably herein, because they provide very similar information about the scene of the image. However, a drawback with conventional stereo vision systems is that obstruction of the field of view of one or both cameras may result in unreliable disparity measurements. For example, dirt or other debris blocking a portion or one of the cameras may result in unreliable disparity measurements for a corresponding portion of the scene captured by the cameras. Another drawback is miscalibration of the position of one camera relative to the other camera, which may skew disparity calculations, resulting in inaccurate depth determinations.

Some stereo vision systems may provide range estimates on a pixel-by-pixel basis. In some such systems, each pixel's range estimate may include a confidence estimate, which may provide an indication of the reliability of the range estimate. Techniques for obtaining confidence estimates are described in US 2022/0111839 entitled "Methods and Systems for Providing Depth Maps with Confidence Estimates," the entirety of which is incorporated by reference herein. A pixel's confidence estimate may be used by a control system of an autonomous moving machine to determine whether to rely on the depth estimate for the pixel or to discard the depth estimate. In some cases, a stereo vision system may be used in conjunction with non-camera sensors to obtain additional information that may be used to augment the stereo vision information, such as in cases where confidence is low for the stereo vision information. For example, information from a lidar sensor and/or a radar (radio detection and ranging) sensor may be used in addition to or instead of stereo vision information.

SUMMARY

An autonomous moving machine may use information from various types of sensors (e.g., lidar, radar, camera, ultrasound, stereo cameras, etc.) to obtain information about the moving machine's surroundings, to enable the moving machine's control system to make decisions about how to steer the moving machine, how to adjust the moving machine's speed (e.g., accelerate or decelerate), whether to deploy safety measures (e.g., turn on warning flashers), etc. The inventors have recognized and appreciated that, to best fuse or combine data from different types of sensors, it is important to calibrate the sensors relative to each other.

According to an aspect of the present technology, an automatically calibrated vision system for an autonomous movable machine is provided. The vision system may be comprised of: a vision calibration system; a first sensor system configured to receive first data of a scene captured by a first sensor on the movable machine and to output a first map based on the first data; a second sensor system configured to receive second data of the scene captured by a second sensor and to output a second map based on the second data. The vision calibration system may be configured to: compute calibration data based on the first and second maps, supply the calibration data to the first sensor system and/or the second sensor system for automatic calibration of the first sensor system and/or the second sensor system, and output, to a controller of the movable machine, a calibrated depth map comprised of depth measurements calibrated using the calibration data. The first sensor system and/or the second sensor system may automatically perform a self-calibration using the calibration data.

In some embodiments of this aspect, the first sensor may be comprised of a pair of stereo camera sensors and may be configured to process stereo image data captured of the scene by the pair of stereo camera sensors. The second sensor may be comprised of a lidar sensor and may be configured to process lidar data captured of the scene by the lidar sensor. The first and second sensors may be synchronized such that the stereo image data and the lidar data are captured simultaneously. In some embodiments, the first map may be a depth map, the second map may be a point cloud, and the vision calibration system may compute the calibration data by: generating an enhanced image based assigning distance measurements of pixels of the depth map to pixels of a rectified image of the stereo image data, projecting the point cloud onto the enhanced image, and determining differences between the point cloud and the enhanced image. In some embodiments, the calibration data may be computed based on an average of the differences between the point cloud and the enhanced image. In some embodiments, the vision calibration system may compute the calibration data by converting the differences between the point cloud and the enhanced image into disparities, and the calibration data may be computed based on an average of the disparities. In some embodiments, the calibration data may be used to calibrate a stereo yaw angle of the pair of stereo camera sensors.

In some embodiments of this aspect, the first sensor may be comprised of a pair of stereo camera sensors and may be configured to process stereo image data captured of the scene by the pair of stereo camera sensors, the second sensor may be comprised of a lidar sensor and may be configured to process lidar data captured of the scene by the lidar sensor, and the vision calibration system may be configured to use the lidar data to calibrate a stereo yaw angle of a pair of stereo camera sensors.

In some embodiments of this aspect, the first sensor may be comprised of a pair of stereo camera sensors and may be configured to process stereo image data captured of the scene by the pair of stereo camera sensors, the second sensor may be comprised of a lidar sensor and may be configured to process lidar data captured of the scene by the lidar sensor, and the self-calibration may be comprised of calibrating a rotation parameter R of the pair of stereo camera sensors and/or calibrating a translation parameter T of the pair of stereo camera sensors. In some embodiments, the pair of stereo camera sensors may be comprised of first and second camera sensors, and the self-calibration may be comprised of calibrating a rotation parameter R of the first camera sensor relative to the second camera sensor and/or calibrating a translation parameter T of the first camera sensor relative to the second camera sensor. In some embodiment, the self-calibration may be comprised of calibrating a rotation parameter R of the lidar sensor relative to the first camera sensor and/or calibrating a translation parameter T of the lidar sensor relative to the first camera sensor.

In some embodiments of this aspect, the first sensor may be comprised of a pair of stereo camera sensors and may be configured to process stereo image data captured of the scene by the pair of stereo camera sensors, the second sensor may be comprised of a lidar sensor and may be configured to process lidar data captured of the scene by the lidar sensor, and the vision calibration system may be configured to: accumulate a plurality of sets of differences for a plurality of enhanced images and a plurality of point clouds determined from a plurality of sets of lidar data and a plurality of sets of stereo image data, and compute the calibration data based on an average of the plurality of sets of differences.

According to another aspect of the present technology, a non-transitory computer-readable storage medium is provided. The storage medium may store computer-executable code that, when executed by a processing system comprised of at least one computer processor, causes the processing system to automatically perform a calibration method to calibrate a vision system for an autonomous movable machine. The calibration method may be comprised of: computing calibration data based on a first map obtained from a stereo vision system and a second map obtained from a lidar system; supplying the calibration data to the stereo vision system and/or the lidar system for automatic calibration of the stereo vision system and/or the lidar system; and outputting, to a controller of the movable machine, a calibrated depth map comprised of depth measurements calibrated using the calibration data. The stereo vision system and/or the lidar system may automatically perform a self-calibration using the calibration data. The stereo vision system and the lidar system may be synchronized such that stereo image data captured by the stere-vision system and lidar data captured by the lidar system are captured simultaneously.

In some embodiments of this aspect, the first map may be a depth map, the second map may be a point cloud, and the calibration data may be computed by: generating an enhanced image based assigning distance measurements of pixels of the depth map to pixels of a rectified image of the stereo image data, projecting the point cloud onto the enhanced image, and determining differences between the point cloud and the enhanced image. In some embodiments, the calibration data may be computed based on an average of the differences between the point cloud and the enhanced image. In some embodiments, the calibration data may be computed by converting the differences between the point cloud and the enhanced image into disparities, and the calibration data may be based on an average of the disparities. In some embodiments, the calibration data may be used to calibrate a stereo yaw angle of camera sensors of the stereo vision system. In some embodiments, the calibration method is further comprised of: accumulating a plurality of sets of differences for a plurality of enhanced images and a plurality of point clouds determined from a plurality of sets of lidar data and a plurality of sets of stereo image data, and computing the calibration data based on an average of the plurality of sets of differences.

The foregoing features may be used, separately or together in any combination, in any of the embodiments discussed herein.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
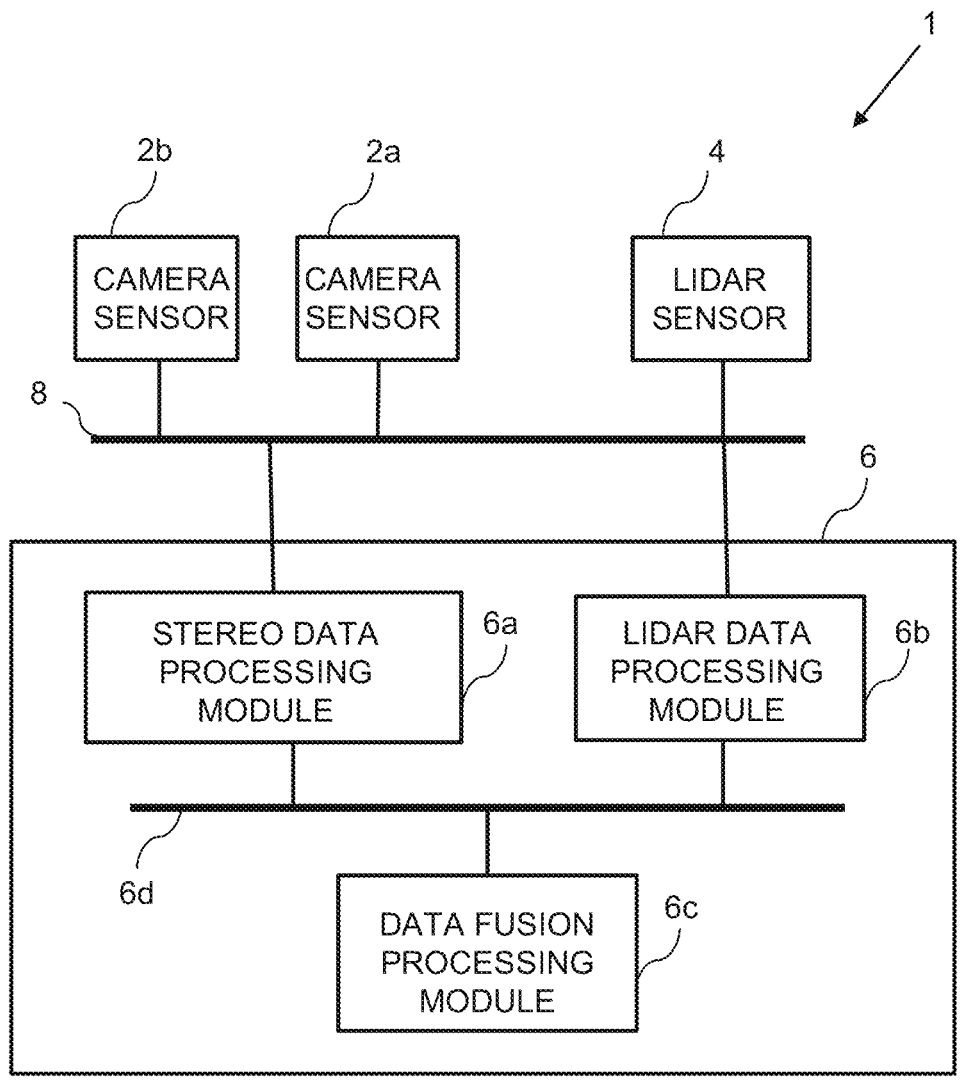
FIG. 1 shows a block diagram of a 3D vision system, according to some embodiments of the present invention.

As noted above, in order for a 3D vision system to enable safe operation of an autonomous moving machine carrying the 3D vision system, the 3D vision system should provide vision information that is reliable and accurate, and should enable sufficient reaction time for a control system of the autonomous moving machine to perform control operations to maneuver the autonomous moving machine safely in response to the vision information. The vision information therefore should be provided to the control system in real time or nearly real time. The inventors of the present technology disclosed herein have recognized and appreciated that, in addition to providing accurate and reliable vision information in real time or nearly real time, if the vision system uses information from two or more different sensors (e.g., a lidar sensor and a stereo sensor comprised of a pair of camera sensors), the different sensors should be calibrated to each other. Such calibrations may, for example, include an adjustment of one or more sensor parameters to account for relative positional changes between the sensors, which may occur from physical shifting of one or more sensors due to vibrations encountered in everyday operation, temperature changes, a structural change in the moving machine (e.g., damage resulting from a collision of the moving machine with another object), etc.

The inventors of the technology disclosed herein have recognized and appreciated that conventional lidar technology uses lidar sensors to produce 3D point clouds, but such information may have one or more of the following drawbacks: a limited distance range; a lack of color information; and data sparsity. A state-of-the-art lidar system may output a point cloud of approximately 600,000 points every second, which by itself may be less than optimal for enabling safe operation of an autonomous moving machine. However, the inventors also have recognized and appreciated that these drawbacks can be reduced or remedied by using information from a pair of stereo cameras. That is, lidar systems and stereo vision systems have different strengths and therefore they may be used together advantageously to complement each other and reduce the effects of each other's weaknesses. For example, a lidar system and a stereo vision system may be used together in an autonomous moving machine to provide redundancy or/or to provide complementary sources of data. In order to increase reliability, sensor data from these two systems should be calibrated to each other. For applications where safety is of utmost importance, such as when the sensor data may be used to control an autonomous vehicle traveling at typical highway speed limits, the sensor data from these two systems should be calibrated as precisely as possible to each other, and the calibration should be performed without affecting real time or nearly real time determination of depth measurements to objects in a scene captured by the two systems. For example, fusion data resulting from combining the sensor data from these two systems may be used to perform object detection of an object that may be in a planned travel path of the vehicle. Therefore, an accurate estimate of distance to the object based on the fusion data is of extreme importance to determine a best course of action to control the vehicle to avoid hitting the object. The travel path may be bumpy (e.g., full of potholes, unpaved, comprised of cobblestones, etc.), which may affect a relative position between cameras of the stereo vision system and/or between a lidar sensor of the lidar system and one or more of the cameras of the stereo vision system. Consequently, accurate inter-sensor calibration between the sensors of the lidar system and the stereo vision system may be highly desirable. Similarly, the fusion data may be used in a simultaneous localization and mapping (SLAM) algorithm used to build a map of an environment of the vehicle and also to localize the vehicle in the map. Therefore, the fusion data should be reliable and accurate, to ensure proper navigational control of the vehicle. Moreover, in situations where high-speed movement may be involved or other situations where decisions based on the fusion data must be made as quickly as possible, the fusion data should be provided to a control system or other processing system as quickly as possible after data is captured by the sensors, to enable the control system to perform real time or nearly real time processing of the fusion data. Operations for calibrating the lidar system relative to stereo vision system preferably should not affect the ability of the two systems to output 3D data in real time or nearly real time. The inventors have recognized and appreciated that information from the lidar system may be used to calibrate the cameras of the stereo vision system to each other. In turn, information from the calibrated stereo vision system may be used to calibrate the lidar system and the stereo vision system to each other, as discussed below.

In some embodiments of the technology disclosed herein, a vision system comprised of a lidar system used in conjunction with stereo cameras of a stereo vision system may provide an enhanced point cloud that may be a denser point cloud (i.e., having more points) than is possible with a conventional lidar system on its own, with the enhanced point could having a distance accuracy comparable to a lidar-based point cloud through calibration techniques described herein. For example, the stereo cameras may be equipped with commercially available CMOS imager sensors having a modest resolution, such as a 5 megapixel (MP) resolution or an 8 MP resolution, although a higher or lower resolution may be used. By utilizing such image sensors, the stereo cameras used in conjunction with the lidar system may enable the stereo cameras to output a calibrated point cloud having the distance accuracy of a lidar-based point cloud but with a point-cloud density (pixel density) that is over 100 times denser than lidar-based point clouds produced by conventional lidar systems. Additionally, such an enhanced point cloud may have the distance accuracy of a lidar-based point cloud and a depth range of a stereo-based point cloud, which may be a larger depth range than is possible with conventional lidar systems. (See U.S. Pat. No. 11,282,234, the entirety of which is incorporated by reference herein.) Furthermore, the enhanced point clouds enabled by the use of camera sensors together with lidar technology may have color associated with the points (e.g., red-green-blue (RGB) colors), which is not possible with typical lidar-based point clouds.

More specifically, typical stereo-based point clouds (i.e., pixels of disparity maps obtained from stereo cameras) by themselves are much denser than lidar-based point clouds. Using 5-MP cameras at ten frames per second, 50 million measurements per second (one point for every pixel) are possible. The points or pixels may also include RGB data of a captured scene. However, an inaccurate calibration of the stereo cameras (i.e., an inaccurate calibration between a left camera and a right camera) may lead to incorrect disparity determinations and, consequently, incorrect depth measurements. With an inaccurate calibration of the stereo cameras, stereo-based distance estimates may consistently underestimate distances in a captured scene or may consistently overestimate distances in the captured scene, and therefore may result in biased distance measurements. The inventors have recognized and appreciated that such an inaccuracy results primarily from an inaccuracy in a yaw angle between the stereo cameras (see FIG. 5). On the other hand, lidar-based distance measurements tend to be relatively accurate compared with stereo-based distance estimates.

According to some embodiments of the technology disclosed herein, the bias present in inaccurately calibrated stereo cameras may be reduced or even removed by calibrating the yaw angle of the stereo cameras using lidar-based distance measurements. In some embodiments, a vision system comprised of stereo cameras and a lidar sensor may be used to "de-bias" the stereo cameras and provide unbiased distance measurements, thus enabling accurate depth data having a point-cloud density comparable to a pixel density of the stereo cameras. In some embodiments, by using camera lenses having a relatively long focal length, (e.g., lenses having a narrow field-of-view and able to capture objects several hundred meters (e.g., 500 m) to over one thousand meters away or even thousands of meters away), the stereo cameras may be able to capture high-quality images of distant objects with clear imaging of the distant objects. From such high-quality images, accurate distance determinations may be performed, even with long-baseline stereo cameras having baselines over 1 m or over 2 m or over 3 m between the stereo cameras. In some embodiments, in addition to de-biasing inaccurate stereo data using lidar data, the lidar sensor maybe calibrated relative to the stereo cameras (e.g., relative to a left one of the stereo cameras). This lidar-stereo calibration may be performed by determining a correspondence between outputs of the stereo cameras (e.g., distance measurements determined from disparity data obtained from the stereo cameras) and outputs of the lidar sensor (e.g., lidar-based distance determinations), which are data used in de-biasing the stereo data.

The relative position between camera sensors of a stereo vision system, and the relative positions between the camera sensors and a lidar sensor of a lidar system may change with time. For example, when used in an autonomous moving machine, the position of the lidar sensor and the positions of the camera sensors may change independently due to various factors, including thermal expansion/contraction of the machine, vibrational motion during operation of the machine, and/or damage caused by shocks, accidents, etc. Some conventional calibration methods use external targets, such as checkerboard-based calibration techniques, which may require a great deal of time and effort by trained engineers and therefore may not be suitable for use in autonomous moving machines. (See, e.g., C. Guindel et al., "Automatic extrinsic calibration for lidar-stereo vehicle sensor setups," 2017 IEEE ITSC Conference on Intelligent Transportation Systems; S. Rajaraman et al., "Fully automatic, unified stereo camera and LiDAR-camera calibration," 2021 Proc. SPIE 11729, Automatic Target Recognition XXXI.) Some conventional calibration techniques may be computationally cumbersome and/or time-consuming or/or may not be sufficiently accurate for use in applications involving control of autonomous moving machines.

The inventors of the technology disclosed herein have recognized and appreciated the need for a combined vision system that utilizes lidar techniques and stereo vision techniques to perform self-calibration accurately, reliably, and in real time or nearly real time. The inventors have developed a technique that may be used for self-calibration of a combined vision system using natural scenes imaged by sensors of the combined vision system, i.e., without the need to provide an external calibration target. As will be appreciated, measurement accuracy of a pair of cameras of a stereo vision system may depend heavily on calibration of the pair. In particular, a yaw angle of each camera relative to a baseline of the pair of cameras and a relative yaw angle (or stereo yaw angle) between the cameras of the pair may be significant factors in accurate estimation of depth or range based on images captured by the pair. Yaw angle is an extrinsic parameter that typically is difficult to determine without the use of an external target. The technique developed by the inventors may be used by a combined vision system to perform self-calibration using natural scenes imaged by sensors of the combined vision system without requiring the use of an external target.

Aspects of the inventive technology disclosed herein provide a combined vision system that employs lidar technology and stereo vision technology and that enables enhanced accuracy and reliability through self-calibration of extrinsic parameters between sensors of the combined vision system. In some embodiments of the present technology, the self-calibration may be performed automatically, without user instruction or intervention. In some embodiments, the self-calibration may be performed continuously during operation of the combined vision system. In some embodiments, the self-calibration may be performed periodically according to a predetermined schedule while the autonomous moving machine is in operation (e.g., once every minute, once every five minutes, once every ten minutes, etc.) and/or intermittently (e.g., at every startup of movement). In some embodiments, self-calibration may be performed in real time or nearly real time by the combined vision system without interruption to determining depths or ranges to objects in an image or scene captured by sensors of the system. In some embodiments, lidar data from a lidar sensor may be used to calibrate a depth range of a pair of cameras of stereo cameras. For example, the lidar data may be used to correct a range calibration of the pair of cameras.

Turning to the figures, FIG. 1 is a block diagram of a combined vision system 1, according to some embodiments of the present invention. The vision system 1 may be configured to be carried by an autonomous machine capable of moving without human intervention (e.g., an autonomous truck, an autonomous car, an autonomous robot, an autonomous aircraft, an autonomous sailing vessel, etc.). The vision system 1 may be comprised of a pair of stereo camera sensors 2a, 2b and a lidar sensor 4 connected to a computer processing system 6 via a communication bus 8 or via a known wireless communication technique.

Figure 2:
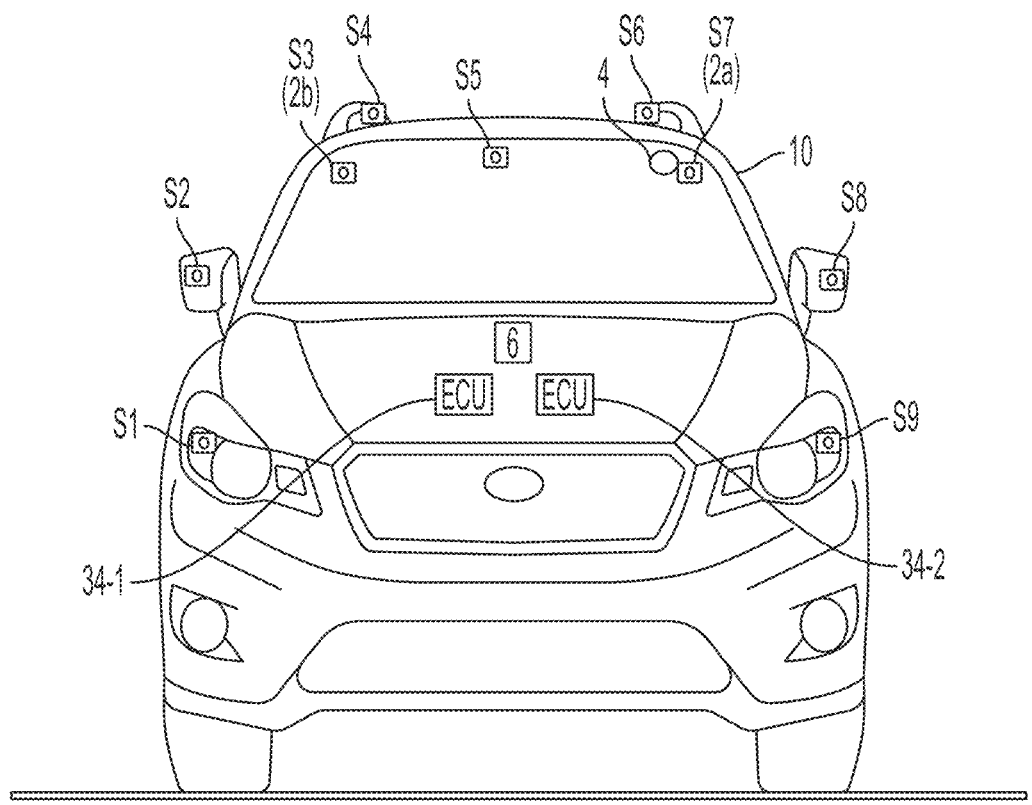
FIG. 2 schematically shows an autonomous vehicle, according to some embodiments of the present invention.

According to some embodiments of the present invention, the autonomous machine may be an autonomous car 10 and the camera sensors 2a, 2b may be comprised of any two of a plurality of cameras sensors S1, S2, . . . , S9 deployed on the car 10, as depicted in FIG. 2. For example, as depicted in FIG. 2, the camera sensor 2a may be comprised of the sensor S7, and the camera sensor 2b may be comprised of the sensor S3. The camera sensors 2a, 2b may be configured to capture images of the car's environment simultaneously, i.e., at the same or nearly the same moment of time. Although the camera sensors 2a, 2b may be referred to herein as "left" and "right" cameras or "left" and "right" sensors, they need not be positioned in a horizontal, left and right configuration but may instead be positioned a vertical configuration (e.g., top and bottom) relative to each other, or diagonally relative to each other, or offset in different range bins (e.g., one camera may be at a front portion of the car 10 and the other camera may be at a rear portion of the car 10). The cameras sensors 2a, 2b may be comprised of, e.g., color CMOS (complementary metal-oxide-semiconductor) cameras, grayscale CMOS cameras, CCD (charge-coupled device) cameras, SWIR (short-wavelength infrared) cameras, LWIR (long-wavelength infrared) cameras, or focal-plane array sensors.

According to some embodiments of the present invention, the lidar sensor 4 may be comprised of a light source (e.g., a laser) and a photosensor. The light source may be configured to emit light into the same environment as the environment in the images captured by the camera sensors 2a, 2b. The light may be scanned to capture information about an area of the environment corresponding to the images. The photosensor may be configured to sense or detect reflected light, which may be emitted light (i.e., from the light source) that is reflected from various objects in the environment.

According to some embodiments of the present invention, the computer processing system 6 of the vision system 1 may be comprised of at least one computer processor coupled to at least one memory. The at least one memory may store a stereo data processing module 6a, a lidar data processing module 6b, and a data fusion processing module 6c. In some embodiments, the stereo data processing module 6a may store code that is executed by the at least one computer processor, the lidar data processing module 6b may store code that is executed by the at least one computer processor, and the data fusion processing module 6c may store code that is executed by the at least one computer processor. In some embodiments, each of the processing modules 6a, 6b, 6c may be coupled to its own computer processor dedicated to executing the code stored in its corresponding processing module. In such embodiments, each of the dedicated computer processors may be in communication with each other via a communication bus 6d or via a known wireless communication means. In some embodiments, the communication bus 6d may be the same as or connected to the communication bus 8. In some other embodiments, all of the processing modules 6a, 6b, 6c may be coupled to a single computer processor configured to execute the code of some or all of the processing modules 6a, 6b, 6c in parallel. Operation of the processing modules 6a, 6b, 6c is discussed below.

Figure 3:
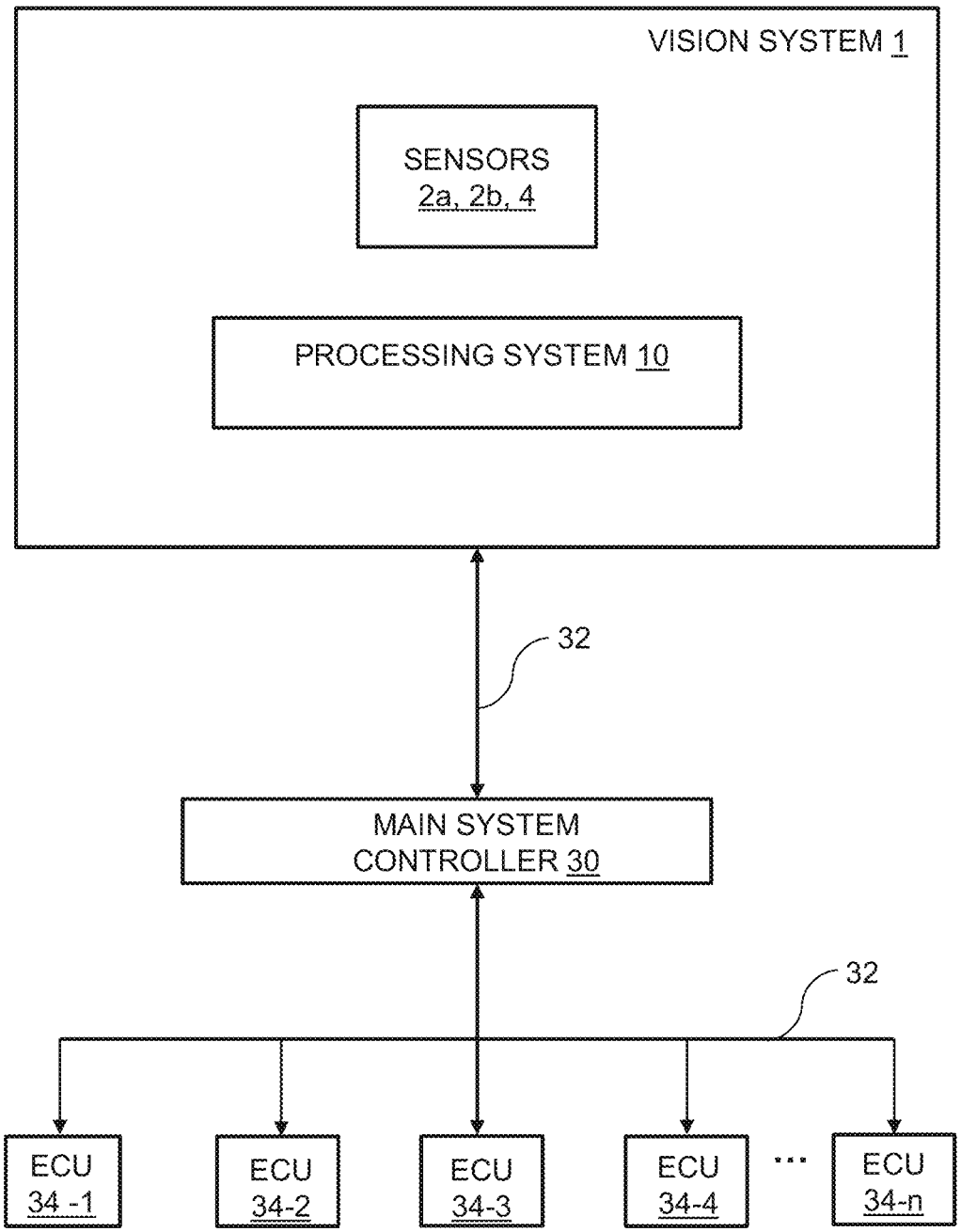
FIG. 3 shows a block diagram of a vision system coupled to electronics of an autonomous vehicle, according to some embodiments of the present invention.

According to some embodiments of the present invention, the vision system 1 may be coupled to a main system controller 30 of the car 10, as schematically shown in FIG. 3. In some embodiments, the main system controller 30 may be the car's control system, which may be configured to control all automated aspects of operation of the car 10. In some embodiments, the vision system 1 may be configured to be commanded by the main system controller 30, and may communicate signals to and receive signals from the main system controller 30 via a command and control line 32. As will be appreciated, the command and control line 32 may be a wired communication mechanism (e.g., a data bus, a communication line) or may be a wireless communication mechanism using communication techniques known in the art. In some embodiments, the main system controller 30 may be comprised of at least one computer processor configured to orchestrate high-level functions (e.g., automatic emergency braking, route selection, etc.) and to communicate with various sub-systems or electronic control units (ECUs) 34-1, 34-2, 34-3, 34-4, . . . , 34-n and with the vision system 1 to carry out the high-level functions. In some embodiments, common communication protocols may be used for communication via the command and control line 32 (e.g., Ethernet, CAN (Controller Area Network), I2C (Inter-Integrated Circuit), LIN (Local Interconnect Network), etc.). Although the vision system 1 is shown in FIG. 3 to be separate from the main system controller 30, the vision system 1 may, in some embodiments, be part of the main system controller 30 and may, in some embodiments, be physically located in a housing of the main system controller 30.

According to some embodiments, the main system controller 30 or a control module (not shown) of the computer processing system 6 of the vision system 1 may be configured to control the camera sensors 2a, 2b and the lidar sensor 4 to capture images synchronously with each other. For example, for each period of time (e.g., every 0.5 second, or every 1 second, or every 1.5 second, etc.), a pair of stereo images and a reflected-light image may be captured simultaneously and provided to their respective processing modules 6a, 6b. In some embodiments, the stereo images may be comprised of simultaneously captured video streams. In such embodiments, lidar data captured by the lidar sensor 4 may be synchronized with frames of the video streams (e.g., a lidar scan of an area may be synchronized with every n$^{th}$ frame of the video streams, where n may be 1 or 5 or 10 or 20 or 50).

According to some embodiments of the present invention, stereo image data of a scene captured by the camera sensors 2a, 2b may be provided to the stereo data processing module 6a for processing (discussed below), and lidar data of the scene captured by the lidar sensor 4 may be provided to the lidar data processing module 6b for processing (discussed below).

Returning to FIG. 1, as noted above, the camera sensors 2a, 2b may be coupled to the stereo data processing module 6a via the communication bus 8 or via a wireless communication technique. In some embodiments of the present invention, image data of a scene captured by the camera sensors 2a, 2b may be transferred via a known communication interface (e.g., a USB (Universal Serial Bus) connector, an Ethernet connector, a MIPI (Mobile Industry Processor Interface) CSI (Camera Serial Interface) connector, GMSL (Gigabit Multimedia Serial Link) connector, Flat Panel Display Link (FPD-Link) connector, and the like). In some embodiments, the camera sensors 2a, 2b may be configured to transmit the image data to the stereo data processing module 6a in real time or nearly real time, directly or via a buffer memory device (e.g., RAM), which may be incorporated in the camera sensors 2a, 2b. In some embodiments, the camera sensors 2a, 2b may be associated with a data-storage memory device (not shown) accessible by the stereo data processing module 6a as well as other parts of the computer processing system 6, and the camera sensors 2a, 2b may be configured to transmit the image data to the data storage device. As mentioned above, the camera sensors 2a, 2b may be video sensors configured to capture streams of video data of the scene. The streams of video data may be comprised of a left stream and a right stream, with each stream being comprised of a sequence of frames. Thus, the term "image data" as used herein may refer to frames of video data, in some embodiments.

Figure 4:
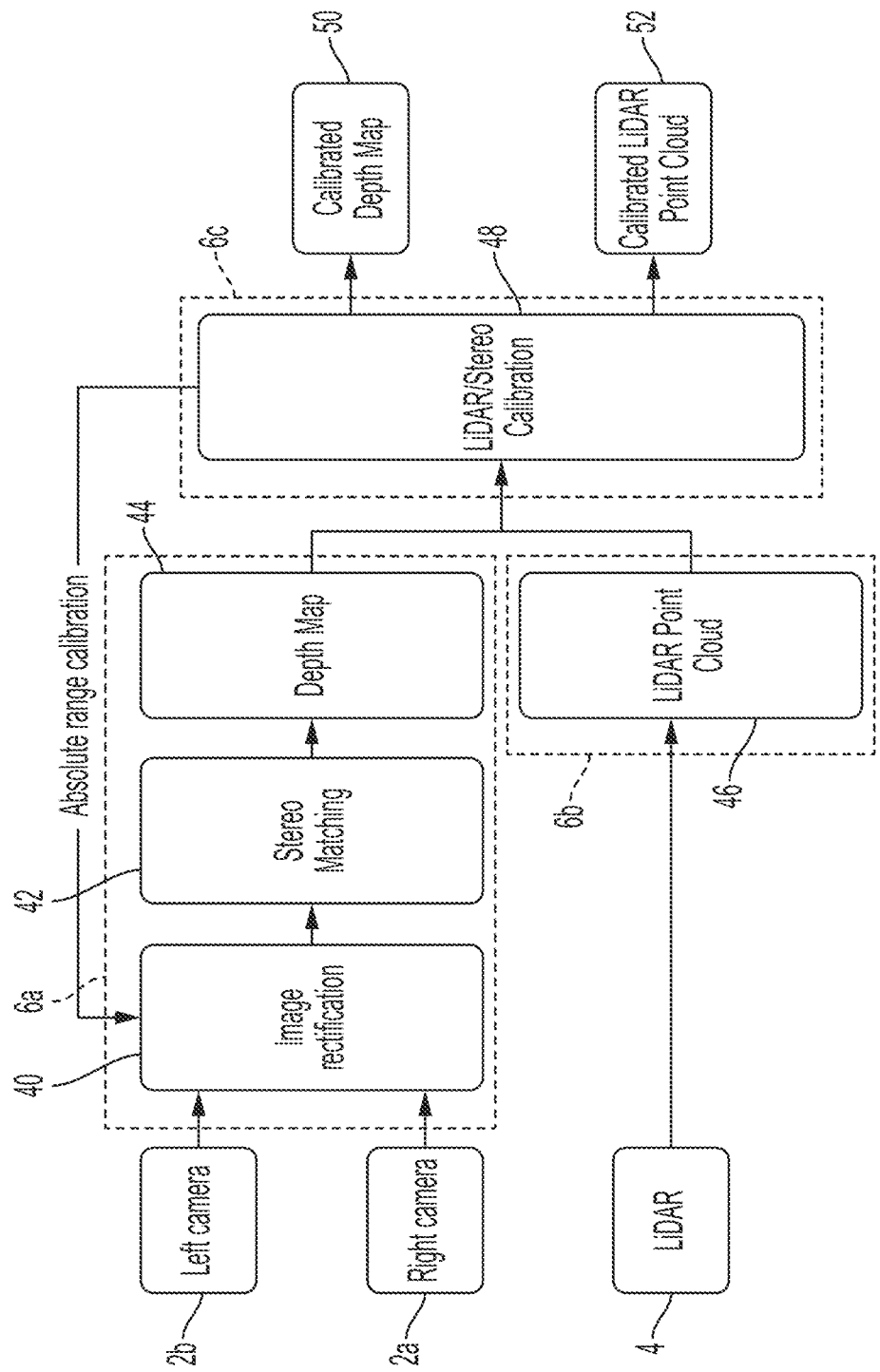
FIG. 4 shows a flow diagram of operations performed by a vision system, according to some embodiments of the present invention.

FIG. 4 shows a flow diagram of operations performed by the vision system 1, according to some embodiments of the present invention. For simplification of the present discussion, the camera sensors 2a, 2b may be referred to as the right camera 2a and the left camera 2b. In some embodiments, the stereo data processing module 6a may be configured to receive digital image data comprised of a left image captured by the left camera 2b and a right image captured by the right camera 2a, and to provide the image data as "raw" or unprocessed image data to an image rectification portion 40 of the stereo data processing module 6a. The image rectification portion 40 may be configured to perform pre-processing of the raw image data. In some embodiments, the pre-processing may correct the raw image data to produce corrected left and right images. For example, the pre-processing may include any one or any combination of: demosaicing; auto-focus, auto-exposure, and auto-white-balance correction; vignetting; noise reduction; bad-pixel filtering; HDR (high-dynamic-range) look-up-table color processing; and image compression. The corrected left and right images may then undergo image rectification.

According to some embodiments of the present technology, the image rectification may be comprised of warping the corrected left and right images so that corresponding rows of pixels of the corrected left and right images are on a same epipolar plane. The warping may produce left and right rectified 2D images. As will be appreciated, image rectification is a known technique used to simplify matching of common objects in the corrected left and right images. The left and right rectified 2D images may be provided to a stereo matching portion 42 of the stereo data processing module 6a.

According to some embodiments of the present invention, the stereo matching portion 42 may be configured to compute a disparity between each matching pixel pair in the left and right rectified 2D images. A stereo-matching technique known in the art may be used. In some embodiments, the processing performed by the stereo matching portion 42 may be comprised of four procedures: a cost computation procedure, a cost aggregation procedure, a disparity computation procedure, and a disparity refinement procedure, as described in US 2022/0111839 entitled "Methods and Systems for Providing Depth Maps with Confidence Estimates," which is incorporated herein by reference in its entirety. Other stereo matching techniques that may be used may include one or more techniques described in "Stereo matching algorithm based on deep learning: A survey" by Mohd Saad Hamid et al. (2020 Journal of King Saud University—Computer and Information Sciences) and/or one or more techniques described in "Stereo Processing by Semi-Global Matching and Mutual Information" by H. Hirschmuller (2008 IEEE Transactions on Pattern Analysis and Machine Intelligence). In some embodiments, the stereo matching portion 42 may produce a disparity map from the left and right rectified 2D images, and may provide the disparity map to a depth map portion 44 of the stereo data processing module 6a.

According to some embodiments of the present invention, the depth map portion 44 may compute a depth map from the disparity map using expression (1):

$$D = \frac{f \times b}{d}, \qquad (1)$$

where D is the distance or depth to the scene, f is the focal length of the camera (e.g., the left camera 2b), b is the baseline or direct distance between the right and left cameras 2a, 2b. That is, for each pixel of the disparity map, the disparity of the pixel may be converted to a depth of the pixel using expression (1).

According to some embodiments of the present invention, the lidar data processing module 6b may be configured to receive digital lidar data captured by the lidar sensor 4. The lidar data may be a point cloud corresponding to a scene captured by the lidar sensor 4. For example, the lidar sensor 4 may be comprised of a laser configured to scan a scene or area of the environment (e.g., by single-direction rastering across the scene, by two-direction or back-and-forth rastering across the scene) to produce a plurality of scan lines. Each scan line may be comprised of a plurality of points of the point cloud, and may be formed by changing, during continuous light emission or with each pulse of pulsed light emissions, a first emission angle (e.g., horizontal angle) of the laser for each point while keeping a second emission angle (e.g., vertical angle) fixed. Scanning from one scan line to a next scan line may be comprised of changing the second emission angle. Thus, each point of each scan line of the scene may be described by its own set of first and second angles. In some embodiments, the lidar sensor 4 may compute, for each point of the point cloud, 3D information (e.g., x, y, z coordinates) based on the first and second emission angles and the round trip time from emission to detection of the laser light for the point. As will be appreciated, a sparse point cloud may not be sufficient to capture reflections from distant objects that may be located in between adjacent points of the point cloud. Although a denser point cloud may be desirable for providing details not present in a sparse point cloud, a desire to have real time or nearly real time depth data may place computational limits on how dense a point cloud can be. However, the calibration techniques described herein may be used advantageously to marry stereo vision data and lidar data via calibration of the corresponding lidar sensor and stereo camera sensors, which may enable, for example, ranges to distant objects between adjacent points of a point cloud to be determined using distance data obtained from a disparity map. For example, data from the disparity map may be used to fill in or add points between adjacent points of the point cloud. Similarly, lidar data may enable accurate (i.e., calibrated) determination of distances to objects appearing in the camera data and the lidar data.

Figure 5:
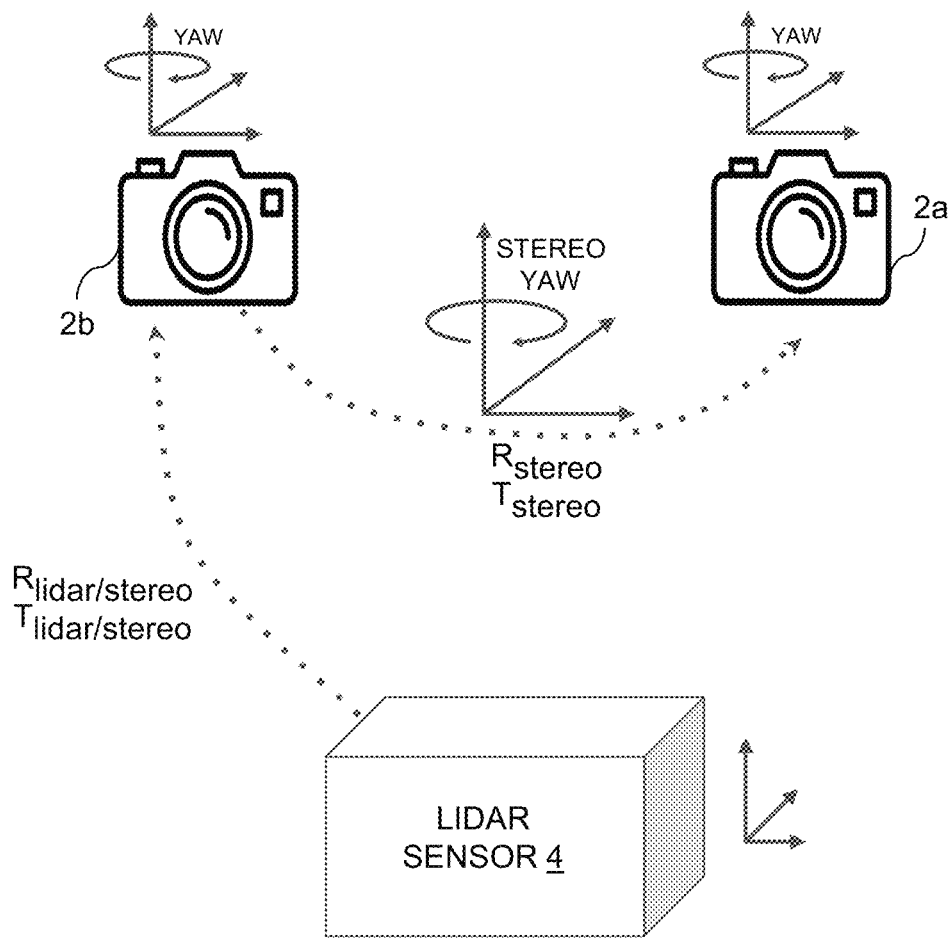
FIG. 5 schematically shows relationships between camera sensors and a lidar sensor, according to some embodiments of the present invention.

According to some embodiments, the depth map produced by the stereo data processing module 6a and the point cloud produced by the lidar data processing module 6b may be provided to the data fusion processing module 6c, which may use the depth map and the point cloud to calibrate the camera sensors 2a, 2b relative to each other and relative to the lidar sensor 4. As noted above, the camera sensors 2a, 2b and the lidar sensor 4 may be controlled to capture data synchronously. In some embodiments, the data fusion processing module 6c may perform a lidar/stereo calibration procedure 48 using the synchronously captured data to calibrate extrinsic parameters of the sensors 2a, 2b, 4. The extrinsic parameters may include a rotation parameter, R, and a translation parameter, T. In some embodiments, the rotation parameter R may represent a rotation between sensors (e.g., a relative rotation between the camera sensor 2a and the camera sensor 2b, or a relative rotation between one of the camera sensors 2a, 2b and the lidar sensor 4). In some embodiments, the translation parameter T may be comprised of an X translation parameter and a Y translation parameter. In some embodiments, as illustrated in FIG. 5, $R_{lidar/stereo}$ and $T_{lidar/stereo}$ may be calculated between the lidar sensor 4 and the left camera sensor 2b. $R_{lidar/stereo}$ and $T_{lidar/stereo}$ may be used to calibrate the left camera sensor 2b relative to the lidar sensor 4. In some embodiments, after the left camera sensor 2b is calibrated, $R_{stereo/stereo}$ and $T_{stereo/stereo}$ may be calculated between the right camera sensor 2a and the left camera sensor 2b. In some embodiments, a yaw angle of the camera sensors 2a, 2b may be one of three angles determining a rotation between the camera sensors 2a, 2b (the other two angles being pitch and roll). Calibration of the camera sensors 2a, 2b may be comprised of a process that determines these three angles and a translation or distance between the camera sensors 2a, 2b. Any known technique may be used determine the rotation $R_{stereo/stereo}$ and the translation $T_{stereo/stereo}$ between the cameras sensors 2a, 2b, including techniques described in U.S. Pat. No. 11,282,234 entitled "Non-Rigid Stereo Vision Camera System," the entirety of which is incorporated by reference herein.

According to some embodiments of the present invention, the lidar/stereo calibration procedure 48 may assume an initial calibration of the camera sensors 2a, 2b; this initial calibration, however, is not assumed to be accurate. That is, the synchronized images captured by the camera sensors 2a, 2b are not assumed to be calibrated to provide accurate disparities and therefore are not assumed to provide accurate depth measurements. Known stereo camera calibration techniques may be used for the initial calibration (see, e.g., H. C. Longuet-Higgins, "A computer algorithm for reconstructing a scene from two projections," Nature, vol. 293, no. 5828, pp. 133-135 (1981); J. Zhang et al., "A robust and rapid camera calibration method by one captured image," IEEE Transactions on Instrumentation and Measurement, vol. 68, no. 10, pp. 4112-4121 (2019)). An inaccurate yaw angle may lead in inaccuracies in the initial calibration, resulting in incorrect depth measurements. In some embodiments, the lidar/stereo calibration procedure 48 may also assume realistic extrinsic parameters between the lidar sensor 4 and the left camera sensor 2b and between the left camera sensor 2b and the right camera sensor 2a. The assumed realistic extrinsic parameters may be from a direct measurement of positions and orientations of the sensors 2a, 2b, 4 or from technical specifications of the autonomous car 10, if the sensors 2a, 2b, 4 are provided on the autonomous car 10.

Figure 6A:
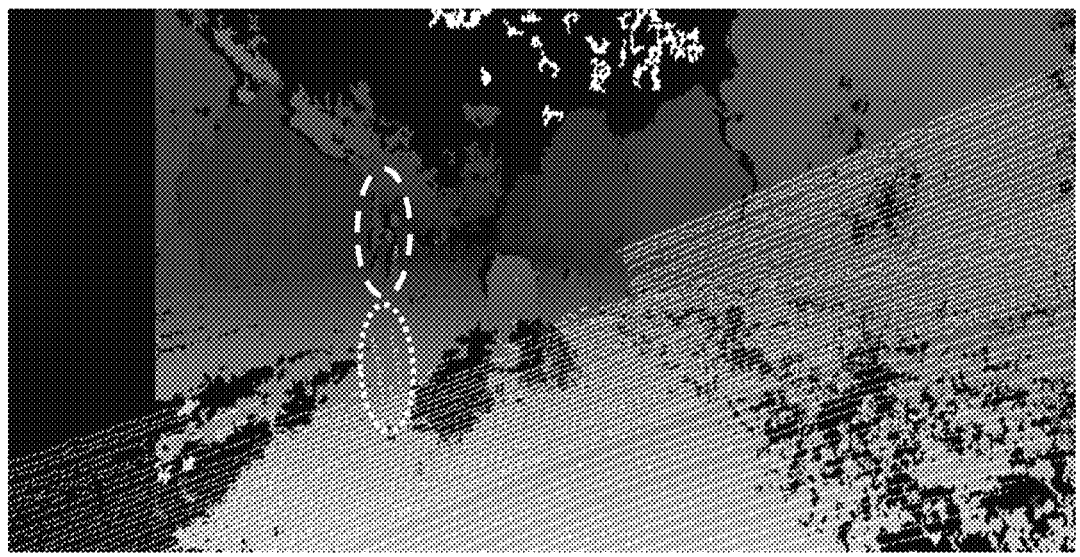
FIG. 6A shows a lidar point cloud (white points) obtained from a lidar sensor projected onto a rectified 2D image obtained from a camera sensor, without extrinsic calibration between the lidar sensor and the camera sensor.
Figure 6B:
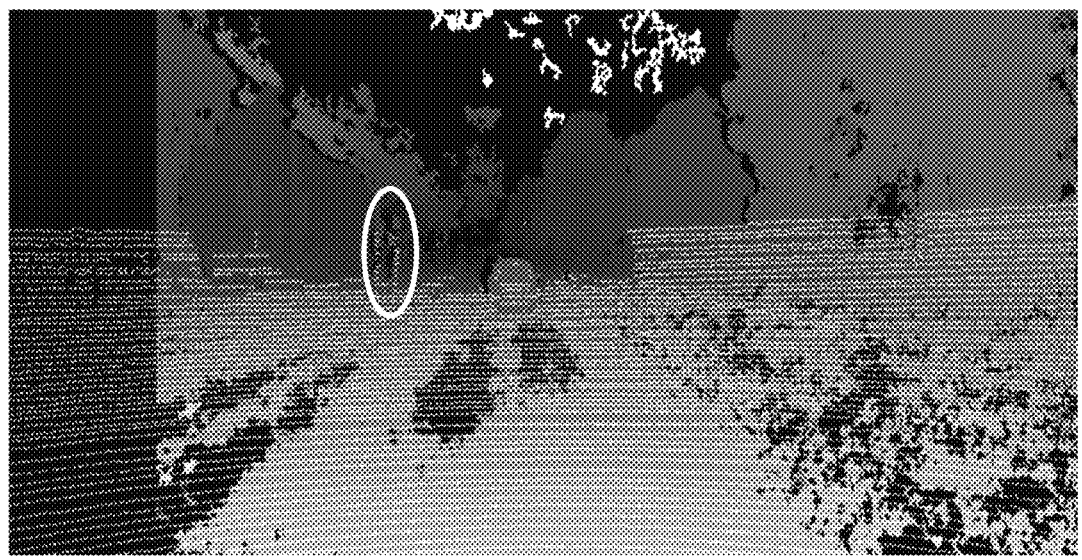
FIG. 6B shows the lidar point cloud projected onto the rectified 2D image, with extrinsic calibration between the lidar sensor and the camera sensor.

According to some embodiments of the present invention, the lidar/stereo calibration procedure 48 may perform a calculation based a stereo-based depth map, which may be determined from the depth map produced by the stereo data processing module 6a, and also based on the point cloud produced by the lidar data processing module 6b ("lidar point cloud"). In some embodiments, the stereo-based depth map may be a map in which the left rectified 2D image is enhanced such that pixels of the left rectified 2D image are assigned corresponding depth values of the pixels of the depth map produced by the stereo data processing module 6a. The stereo-based depth map, which may also be referred to herein as the enhanced left rectified 2D image, may then be projected onto a point-cloud space to produce a camera point cloud. The camera point cloud may then be compared with the lidar point cloud directly. However, an inaccuracy in calibration and/or a difference in the greater number of points in the camera point cloud relative to the fewer number of points in the lidar point cloud, may lead to difficulties in performing a direct comparison of depth measurements in the camera point cloud with depth measurements in the lidar point cloud. To minimize such difficulties, the lidar/stereo calibration procedure 48 may perform the comparison in the opposite direction, i.e., to compare relatively fewer number of points of the lidar point cloud with the relatively greater number of points of the camera point cloud. As noted above, the camera point cloud corresponds to the enhanced left rectified 2D image, in which the depth measurements of the depth map are represented, as depicted in FIGS. 6A and 6B. In FIG. 6A, a lidar point cloud (white points or dots) obtained from the lidar sensor 4 is projected onto the enhanced left rectified 2D image, without extrinsic calibration between the lidar sensor 4 and the camera sensors 2a, 2b. In FIG. 6B, the lidar point cloud is projected onto the enhanced left rectified 2D image, with extrinsic calibration between the lidar sensor 4 and the camera sensors 2a, 2b. As shown in FIG. 6A, without calibration, points of the lidar point cloud do not correspond accurately with pixels of the enhanced left rectified 2D image, i.e., features in the lidar point cloud are not aligned with features in the enhanced rectified 2D image. For example, a location of parallel vertical objects appearing in the enhanced left rectified 2D image (see upper, dashed oval) does not align with a location of points or dots of the lidar point cloud forming parallel lines in the lidar point cloud (see lower, dotted oval). With calibration, as shown in FIG. 6B, the lidar point cloud is aligned with the left rectified 2D image, indicating that the position of the lidar sensor 4 is calibrated to the positions of the camera sensors 2a, 2b. In FIG. 6B, the parallel objects in the enhanced left rectified image align with the points or dots forming the parallel vertical lines in the lidar point cloud (see solid oval). Although not as clearly evident as the parallel vertical objects and the parallel lines of dots, faint horizontal striations may be seen in the enhanced left rectified 2D image of FIG. 6A whereas striations of dotted lines of the point cloud appear at an angle of approximately 35°, indicating that the camera sensors 2a, 2b and the lidar sensor 4 are not calibrated to each other. In contrast, in FIG. 6B, the striations of dotted lines of the point cloud are horizontal, indicating that the position of the lidar sensor 4 is calibrated to the positions of the camera sensors 2a, 2b. This manner of projection may enable lidar and camera-based depth measurements to be easily associated with each other, as the relatively fewer number of points of the lidar point cloud may easily be projected or mapped onto the relatively greater number of points of the camera point cloud corresponding to the enhanced left rectified image.

In some embodiments of the present invention, the depth measurements of the lidar point cloud may be assumed to be accurate and may be used to determine whether the depth measurements of the enhanced left rectified 2D image are accurate. In some embodiments, an overall depth error may be determined from differences between the depth measurements of the lidar point cloud and the depth measurements of the enhanced left rectified image. For example, the overall depth error may be an average of the depth differences of some or all of the points of the lidar point cloud and their corresponding pixels in the enhanced left rectified image. The overall depth error may be used to calculate an overall disparity error using expression (1), discussed above, to convert depth values to disparity values. The overall disparity error may be used to determine one or more range-calibration values for an absolute range calibration of the stereo data processing module 6a. In some embodiments, the one or more range-calibration values may be provided to the stereo data processing module 6a (e.g., to the image rectification portion 40 of the stereo data processing module 6a) to calibrate an absolute range determination function of the stereo data processing module 6a. Although there are six parameters that may be used to describe a relative position between the two camera sensors 2a, 2b (i.e., yaw, pitch, and roll rotational parameters (e.g., angles) and x, y, and z orthonormal translation parameters), all of which may be used in rectification of images captured by the camera sensors 2a, 2b, stereo-based distance measurements is particularly sensitive to a yaw angle between the camera sensors 2a, 2b. Therefore, some embodiments of the technology disclosed herein may rely predominantly on calibration based on a correction of the yaw angle (e.g., a minimization of a yaw-angle error) between the camera sensors 2a, 2b. In some embodiments, the yaw angle is corrected to align the lidar-based distance measurements to the stereo-based distance measurements so that they have the same values. Therefore, in some embodiments, a continuous calibration loop may be performed to (1) align and calibrate the camera sensors 2a, 2b to each other, and (2) to align and calibrate the left camera sensor 2b (or the right camera sensor 2a) to the lidar sensor 4, and then repeating (1) and then repeating (2), etc.

Figure 7:
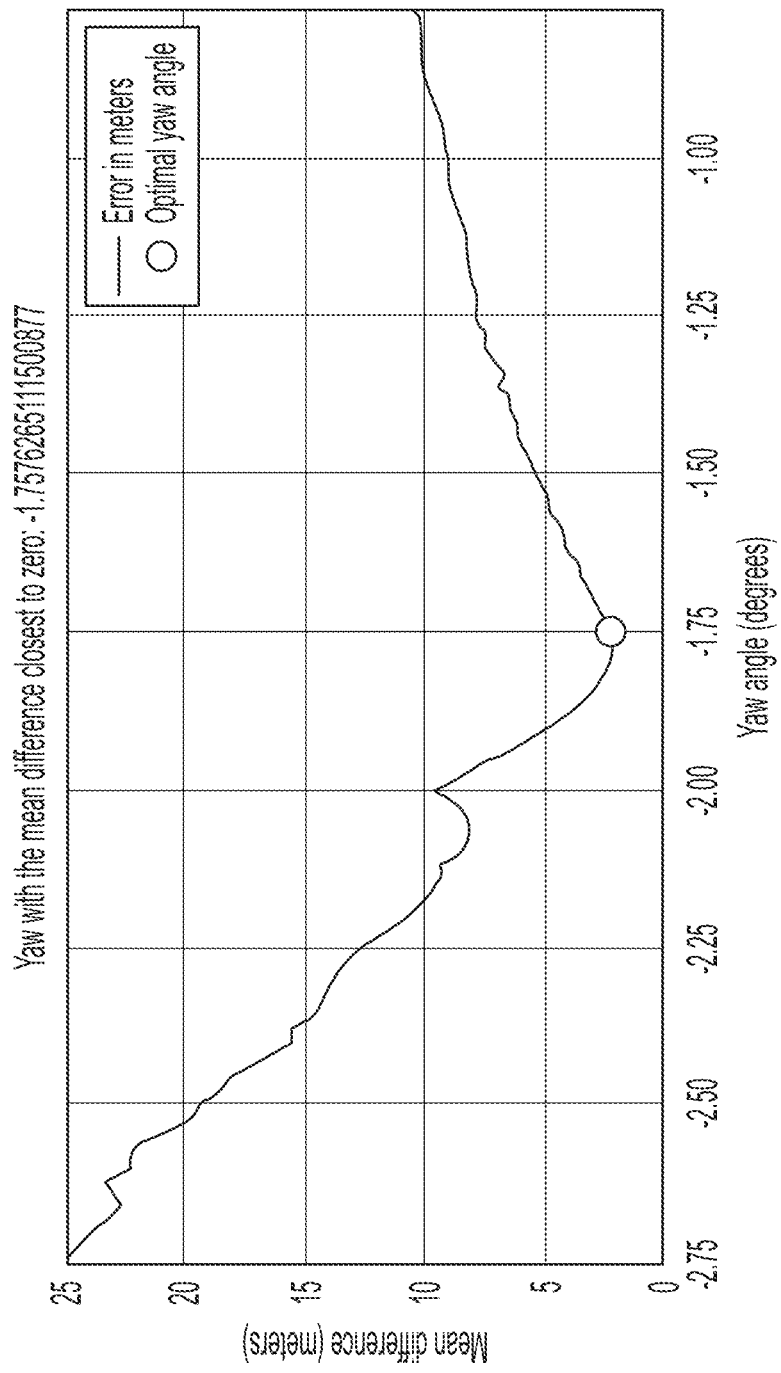
FIG. 7 shows a chart with a curve representing a variation in error (e.g., mean difference between lidar-based depth measurement and stereo-based depth measurement) as a function of yaw angle between camera sensors.

Having found a correspondence between the lidar-based depth measurements and camera-based depth measurements, how well the measurements match may be determined by an error function $E_1$, which corresponds to a mean absolute difference between the two types of measurements and which may be calculated according to expression (2):

$$E_1 = \frac{1}{N_{points}} \sum_{i=0}^{N_{points}} |P_L(X_i) - D_i|, \qquad (2)$$

where $X_i$ represents points in the lidar point cloud, $P_L(X_i)$ represents a projection of $X_i$ onto an image plane corresponding to the enhanced left rectified 2D image, $D_i$ represents the camera-based depth measurements corresponding to $X_i$, and $N_{points}$ represents the number of overlapping points between the lidar point cloud and the camera point cloud. In some embodiments, points of the lidar point cloud that project outside of the enhanced left rectified 2D image may not be included in the sum of expression (2), as these "outside" points do not have corresponding camera-based depth measurements. When the lidar sensor 4 and the camera sensors 2a, 2b are aligned, a minimum in the error function $E_i$ is attained. FIG. 7 shows a chart with a curve representing a variation in error (i.e., a mean difference between lidar-based depth measurement and stereo-based depth measurement), on the vertical axis, as a function of yaw angle of the camera sensors 2a, 2b, on the horizontal axis. In FIG. 7, a dot at a minimum in the curve represents an optimal yaw angle to be used for calibration of the camera sensors 2a, 2b. Therefore, the vision system 1 may perform self-calibration by automatic adjustment of one or more of the sensors 2a, 2b, 4 to minimize the error function $E_1$. In some embodiments, during an automated $E_1$ minimization process, some or all of known extrinsic parameters between the lidar sensor 4 and the camera sensors 2a, 2b (e.g., relative translation and/or relative rotation between them) may be adjusted and/or a relative yaw angle ("stereo yaw angle") between the left camera sensor 2b and the right camera sensor 2a may be adjusted. The automated $E_1$ minimization process may be comprised of a known optimization method (e.g., a Nelder-Mead type of algorithm). (See J. A. Nelder et al., "A simplex method for function minimization," Computer Journal, vol. 7, no. 4, pp. 308-313 (1965).)

An error in an estimated value of the stereo yaw angle between the camera sensors 2a, 2b may lead to erroneous detection of upcoming road hazards. When the estimated value of the stereo yaw angle is smaller than an actual value for the stereo yaw angle, disparity measurements obtained from images of a scene captured by the camera sensors 2a, 2b may be lower than they should be, leading to an overestimation of depth or distance measurements calculated based on the captured images. In other words, the depth map calculated for the scene may have depth or distance measurements that are larger or farther than their actual values. Such an overestimation may lead to, e.g., an erroneous determination that an object in the road is farther away from the autonomous car 10 than it actually is, which may in turn result in a miscalculation of a minimum response time for safely avoiding the object. Similarly, when the estimated value for the stereo yaw angle is larger than the actual value, the depth measurements determined for the scene may be underestimated.

According to some embodiments of the present invention, if the relative position between the right camera sensor 2a and the left camera sensor 2b is known, calibration of the stereo yaw angle may be simplified to removing a relative bias between the sensors 2a, 2b. One the other hand, if the relative position is not known, depth measurements obtained from the lidar sensor 4 ("lidar measurements") may be used to calibrate the stereo yaw angle. In some embodiments, it may be assumed that the lidar measurements are unbiased, i.e., the lidar measurements are true or actual depth measurements. With such an assumption, the stereo yaw angle may be determined based on a root of a relative bias $E_2$ between the sensors 2a, 2b. In some embodiments, the relative bias $E_2$ may be calculated using expression (3):

$$E_2 = \frac{1}{N_{points}} \sum_{i=0}^{N_{points}} (P_L(X_i) - D_i). \quad (3)$$

The root of the relative bias $E_2$ may be found using known algorithms (e.g. a bisection algorithm). Stated differently, calibration of the camera sensors 2a, 2b may be based on an assumption that lidar measurements are accurate and therefore may be used to provide an unbiased estimate of distance. With such an assumption, calibration of the camera sensors 2a, 2b may be based on correction of a yaw angle between the camera sensors 2a, 2b. As noted above, an incorrect yaw angle may lead to a consistent bias in distances determined from disparity measurements obtained from stereo images captured by the camera sensors 2a, 2b. By correlating lidar-based distance measurements with stereo-based distance measurements, an optimal yaw angle may be determined, which may be used to calibrate the camera sensors 2a, 2b and, consequently, de-bias the stereo-based distance measurements.

More specifically, the lidar-based distance measurements of $P_L(X_i)$, which represents a projection of $X_i$ onto an image plane corresponding to the enhanced left rectified 2D image, can be represented by expression (4):

$$P_L(X_i) = X_i^* + \eta_{Lidar}(X_i), \quad (4)$$

where $X_i^*$ is the correct measurement value and $\eta_{Lidar}$ is a measurement noise of the lidar sensor 4. The measurement noise can be assumed to be small and to be unbiased, i.e., to have a zero mean: $\Sigma_i \eta_{Lidar}(X_i) \approx 0$. Similarly, the stereo-based distance measurements of $D_i$ can be represented by expression (5):

$$D_i = X_i^* + B_i(\Delta\theta YAW) + \eta_{Stereo}(X_i), \quad (5)$$

where $X_i^*$ is the correct measurement value and $\eta_{stereo}$ is a measurement noise of the camera sensors 2a, 2b. The measurement noise can be assumed to be small and to be unbiased, i.e., to have a zero mean: $\Sigma_i \eta_{Stereo}(X_i) \approx 0$. In expression (5), $B_i(\Delta\theta_{YAW})$ is a measurement bias measurement introduced primarily by incorrect calibration of the yaw angle between the camera sensors 2a, 2b, with $\Delta\theta_{YAW}$ corresponding to a magnitude of a calibration inaccuracy of the yaw angle. If $\Delta\theta YAW=0$, such as when the yaw angle is known exactly, the measurement bias can be assumed to be equal to 0. Consequently, in some embodiments of the technology disclosed herein, a determination of the yaw angle may play an important role in calibration of stereo-based distance measurements. The yaw angle may be determined by analyzing and minimizing bias in the stereo-based distance measurements, by determining optimal values to achieve expression (6):

$$0 = -\sum_i B_i(\Delta\theta_{YAW}) \approx \quad (6)$$

-continued $$\sum_i ((X_i^* + \eta_{Lidar}(X_i)) - (X_i^* + B_i(\Delta\theta_{YAW}) + \eta_{Stereo}(X_i))) = \Sigma_i(P(X_i) - D_i).$$

In some embodiments of the present invention, it may be assumed that the relative position of the camera sensors 2a, 2b and the lidar sensor 4 does not change on a short time scale (e.g., 5 minutes or less, 2 minutes or less, one minute or less, 30 seconds or less 15 seconds or less), the error function $E_1$ and the relative bias $E_2$ may be aggregated over multiple frames of a video sequence of frames (e.g., 10 frames, 25 frames, 50 frames, 100 frames, etc.).

According to some embodiments of the present invention, the data fusion processing module 6c may output a calibrated depth map 50 and/or a calibrated point cloud 52. The calibrated depth map 50 and/or the calibrated point cloud 52 may be provided to the main system controller 30 to control movement of the car 10.

CONCLUSION

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B" when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. An automatically calibrated vision system for an autonomous movable machine, the vision system comprising:
    a vision calibration system;
    a first sensor system configured to process stereo image data of a scene captured by first and second camera sensors on the movable machine and to output a first map based on the stereo image data; and
    a second sensor system configured to process lidar data of the scene captured by a lidar sensor on the movable machine and to output a second map based on the lidar data,
    wherein the first and second camera sensors and the lidar sensor are synchronized such that the stereo image data and the lidar data are captured simultaneously,
    wherein the vision calibration system is configured to:
        compute calibration data by performing a lidar/stereo calibration based on the first and second maps, the lidar/stereo calibration simultaneously minimizing errors based on the first map and errors based on the second map,
        supply the calibration data to the first sensor system and the second sensor system for automatic calibration of the first sensor system and automatic calibration of the second sensor system, and
        output in real time or nearly real time, to a controller of the movable machine, a calibrated depth map comprising depth measurements calibrated using the calibration data, and
    wherein the first sensor system and the second sensor system automatically perform self-calibration using the calibration data, the self-calibration comprising:
        calibrating a rotation parameter R of the lidar sensor relative to the first camera sensor,
        calibrating a translation parameter T of the lidar sensor relative to the first camera sensor, and
        calibrating a stereo yaw angle of the first and second camera sensors.

2. The vision system of claim 1, wherein:
    the first map is a depth map,
    the second map is a point cloud, and
    the vision calibration system computes the calibration data by:
        generating an enhanced image based assigning distance measurements of pixels of the depth map to pixels of a rectified image of the stereo image data,
        projecting the point cloud onto the enhanced image, and
        determining differences between the point cloud and the enhanced image.

3. The vision system of claim 2, wherein the calibration data is computed based on an average of the differences between the point cloud and the enhanced image.

4. The vision system of claim 2, wherein:
    the vision calibration system computes the calibration data by converting the differences between the point cloud and the enhanced image into disparities, and
    the calibration data is computed based on an average of the disparities.

5. The vision system of claim 1, wherein the self-calibration comprises calibrating a rotation parameter R of the first and second camera sensors and calibrating a translation parameter T of the first and second camera sensors.

6. The vision system of claim 1, wherein the self-calibration comprises calibrating a rotation parameter R of the first camera sensor relative to the second stereo camera sensor and/or calibrating a translation parameter T of the first camera sensor relative to the second stereo camera sensor.

7. The vision system of claim 2, wherein the vision calibration system is configured to:
   accumulate a plurality of sets of differences for a plurality of enhanced images and a plurality of point clouds determined from a plurality of sets of lidar data and a plurality of sets of stereo image data, and
   compute the calibration data based on an average of the plurality of sets of differences.

8. A non-transitory computer-readable storage medium storing computer-executable code that, when executed by a processing system comprising at least one computer processor, causes the processing system to automatically perform a calibration method to calibrate a vision system for an autonomous movable machine, the calibration method is-comprising:
   computing calibration data by performing a lidar/stereo calibration based on a first map obtained from a stereo vision system and a second map obtained from a lidar system, wherein:
      the first map corresponds to stereo image data captured by first and second camera sensors of the stereo vision system,
      the second map corresponds to lidar data captured by a lidar sensor of the lidar system,
      the stereo image data and the lidar data are captured simultaneously, and
      the lidar/stereo calibration simultaneously minimizes errors based on the first map and errors based on the second map;
   outputting the calibration data to to the stereo vision system and the lidar system for automatic self-calibration of the stereo vision system and the lidar system in real time or nearly real time using the calibration data, the self-calibration comprising:
      calibrating a rotation parameter R of the lidar sensor relative to the first camera sensor,
      calibrating a translation parameter T of the lidar sensor relative to the first camera sensor, and
      calibrating a stereo yaw angle of the first and second camera sensors of the stereo vision system; and
   outputting in real time or nearly real time, to a controller of the movable machine, a calibrated depth map comprising depth measurements calibrated using the calibration data.

9. The computer-readable storage medium of claim 8, wherein:
   the first map is a depth map,
   the second map is a point cloud, and
   wherein the calibration data is computed by:
      generating an enhanced image based assigning distance measurements of pixels of the depth map to pixels of a rectified image of the stereo image data,
      projecting the point cloud onto the enhanced image, and
      determining differences between the point cloud and the enhanced image.

10. The computer-readable storage medium of claim 9, wherein the calibration data is computed based on an average of the differences between the point cloud and the enhanced image.

11. The computer-readable storage medium of claim 9, wherein:
   the calibration data is computed by converting the differences between the point cloud and the enhanced image into disparities, and
   the calibration data is based on an average of the disparities.

12. The computer-readable storage medium of claim 9, wherein the calibration method further comprises:
   accumulating a plurality of sets of differences for a plurality of enhanced images and a plurality of point clouds determined from a plurality of sets of lidar data and a plurality of sets of stereo image data, and
   computing the calibration data based on an average of the plurality of sets of differences.

* * * * *

UNITED STATES PATENT AND TRADEMARK OFFICE
CERTIFICATE OF CORRECTION

| | |
|---|---|
| PATENT NO. | : 11,782,145 B1 |
| APPLICATION NO. | : 17/867826 |
| DATED | : October 10, 2023 |
| INVENTOR(S) | : Piotr Swierczynski et al. |

It is certified that error appears in the above-identified patent and that said Letters Patent is hereby corrected as shown below:

In the Claims

At Column 20, Claim 2, Line 50, the text "generating an enhanced image based assigning distance" should read -- generating an enhanced image based on assigning distance --.

At Column 21, Claim 8, Line 21, the text "autonomous movable machine, the calibration method is-" should read -- autonomous movable machine, the calibration method --.

At Column 21, Claim 8, Line 37, the text "outputting the calibration data to to the stereo vision" should read -- outputting the calibration data to the stereo vision --.

At Column 22, Claim 9, Line 16, the text "generating an enhanced image based assigning distance" should read -- generating an enhanced image based on assigning distance --.

Signed and Sealed this
Second Day of April, 2024

*Katherine Kelly Vidal*

Katherine Kelly Vidal
*Director of the United States Patent and Trademark Office*